US008625595B2

(12) United States Patent
Banerjee

(10) Patent No.: US 8,625,595 B2
(45) Date of Patent: Jan. 7, 2014

(54) FIBER CHANNEL IDENTIFIER MOBILITY FOR FIBER CHANNEL AND FIBER CHANNEL OVER ETHERNET NETWORKS

(75) Inventor: Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 12/954,998

(22) Filed: Nov. 29, 2010

(65) Prior Publication Data
US 2012/0134672 A1 May 31, 2012

(51) Int. Cl.
H04L 12/28 (2006.01)

(52) U.S. Cl.
USPC ............ 370/392; 370/389; 370/396; 370/351

(58) Field of Classification Search
USPC ............ 370/351, 254, 401, 248, 409, 395.53, 370/428, 466, 474, 221; 709/249, 237, 238, 709/223, 245, 220, 221; 710/14; 726/12
See application file for complete search history.

(56) References Cited

U.S. PATENT DOCUMENTS

| 5,892,912 | A | 4/1999 | Suzuki et al. | |
|---|---|---|---|---|
| 6,876,656 | B2 | 4/2005 | Brewer et al. | |
| 6,985,490 | B2 * | 1/2006 | Czeiger et al. | 370/401 |
| 7,283,746 | B2 | 10/2007 | Ikeda | |
| 7,484,021 | B2 * | 1/2009 | Rastogi et al. | 710/74 |
| 7,644,179 | B1 * | 1/2010 | Jain et al. | 709/238 |
| 7,656,812 | B2 * | 2/2010 | Tadimeti et al. | 370/248 |
| 7,664,823 | B1 * | 2/2010 | Wakerly | 709/211 |
| 7,890,654 | B1 * | 2/2011 | Tadimeti et al. | 709/238 |
| 8,166,176 | B2 * | 4/2012 | Kumar et al. | 709/227 |
| 2004/0151188 | A1 | 8/2004 | Maveli | |
| 2005/0036499 | A1 | 2/2005 | Dutt et al. | |
| 2005/0053073 | A1 | 3/2005 | Kloth et al. | |
| 2006/0092932 | A1 | 5/2006 | Ghosh et al. | |
| 2006/0159081 | A1 | 7/2006 | Dropps | |
| 2007/0011276 | A1 * | 1/2007 | Sharma et al. | 709/218 |
| 2007/0058619 | A1 | 3/2007 | Gopal Gowda et al. | |
| 2007/0130295 | A1 * | 6/2007 | Rastogi et al. | 709/220 |
| 2008/0313724 | A1 * | 12/2008 | Doddapaneni et al. | 726/9 |
| 2009/0092141 | A1 | 4/2009 | Banerjee | |
| 2009/0094354 | A1 * | 4/2009 | Rastogi et al. | 709/221 |
| 2009/0141657 | A1 | 6/2009 | Dutt et al. | |
| 2011/0176412 | A1 * | 7/2011 | Stine et al. | 370/221 |
| 2011/0228670 | A1 * | 9/2011 | Sasso et al. | 370/221 |
| 2011/0299539 | A1 * | 12/2011 | Rajagopal et al. | 370/395.53 |
| 2012/0054850 | A1 * | 3/2012 | Bhardwaj et al. | 726/12 |

* cited by examiner

Primary Examiner — Anh-Vu Ly
Assistant Examiner — Gustavo Lopez-Vargas
(74) Attorney, Agent, or Firm — Edell, Shapiro & Finnan, LLC

(57) ABSTRACT

Techniques are provided for a switch to assign proxy FCIDs to endpoint device so that the endpoint devices may achieve FCID mobility by retaining their originally assigned FCIDs. At a switch in a network, e.g., a Virtual Storage Area Network (VSAN), a fabric login request is received from a first endpoint device that is associated with a first FC identifier (FCID) that was previously assigned to the first endpoint device by another switch in the VSAN. The fabric login request is responded to with the first FCID. The first endpoint device is assigned a second FCID associated with a domain of the switch where the endpoint device is directly attached to, and the second FCID is used as a proxy FCID within the VSAN for the first endpoint device. A frame is received from the first endpoint device with a source FCID comprising the first FCID and a destination FCID comprising an FCID for a second endpoint device. The source FCID in the frame is overwritten with the second FCID. The frame is forwarded to the second endpoint device.

24 Claims, 8 Drawing Sheets

At a first switch coupled to a first endpoint device and a second switch, where the second switch is coupled to a second endpoint device and has assigned the second endpoint device an original FCID, receive a message from a third switch comprising information that indicates that the second endpoint device has been assigned a proxy FCID that is configured to proxy for the original FCID — 550

↓

Receive a first frame from the third switch with a source FCID comprising the proxy FCID and a destination FCID comprising an FCID for the first endpoint device — 555

↓

Overwrite the proxy FCID in the first frame with the original FCID — 560

↓

Forward the first frame to the first endpoint device — 565

US 8,625,595 B2

FIBER CHANNEL IDENTIFIER MOBILITY FOR FIBER CHANNEL AND FIBER CHANNEL OVER ETHERNET NETWORKS

TECHNICAL FIELD

The present disclosure generally relates to Storage Area Networks (SANs) and more particularly to providing Fiber Channel identifier (FCID) mobility for Fiber Channel and FC over Ethernet (FCoE) networks.

BACKGROUND

Storage Area Networks (SANs) reliably store large amounts of data for an organization. Clusters of storage devices, e.g., FC storage arrays, in one location are called SAN islands and communicate using the FC Protocol. Users accessing a SAN may reside on an Ethernet based Local Area Network (LAN) at another location that may be coupled to an FC server cluster for communication with the FC storage array. To mediate communication between the FC server cluster and the FC storage array, an FC switch network (also called "switched fabric") is employed.

Recent advances have led to virtualization in SANs resulting in the creation of Virtual SANs (VSANs). VSANs and VLANs remove the physical boundaries of networks and allow a more functional approach. For example, an engineering department VLAN can be associated with an engineering department VSAN, or an accounting department VLAN can be associated with an accounting department VSAN, regardless of the location of network devices in the VLAN or storage devices in the VSAN. In a virtualized environment, virtual devices can move from one place to another without requiring any physical connectivity changes.

Each FC switch or FCoE FC Forwarder (FCF) has a numbered domain that forms the first part of an FCID. The FCID comprises three bytes (Domain.Area.Port) in a frame header to identify source ports of a source device and destination ports of a destination device. When a virtual SAN device logs into the switch fabric it is assigned an FCID with a domain associated with the respective switch. When a virtual SAN device migrates from a first switch to a second switch, the virtual SAN device must log out of the SAN and log back in via the second switch, thereby acquiring a new FCID associated with the domain of the second switch.

BRIEF DESCRIPTION OF THE DRAWINGS

FIG. 7 is an example flowchart depicting a process for providing FCID mobility for network endpoints according to a second embodiment.

DESCRIPTION OF EXAMPLE EMBODIMENTS

Overview

Techniques are provided herein to assign proxy FCIDs to endpoint device so that the endpoint devices may achieve FCID mobility by retaining their originally assigned FCIDs. At a switch in a network, e.g., a Virtual Storage Area Network (VSAN), a login request, e.g., fabric login (FLOGI), is received from a first endpoint device that is associated with a first FC identifier (FCID) that was previously assigned to the first endpoint device by another switch in the network. The login request is responded to with the first FCID. The first endpoint device is assigned a second FCID associated with a domain of the switch and the second FCID is used as a proxy FCID within the network for the first endpoint device. A first frame is received from the first endpoint device with a source FCID comprising the first FCID and a destination FCID comprising an FCID for a second endpoint device. The source FCID in the first frame is overwritten with the second (proxy) FCID. The first frame is forwarded to the second endpoint device.

Techniques are provided herein for receiving a second frame from another switch in the network with a destination FCID comprising the second (proxy) FCID. The destination proxy FCID in the second frame is overwritten with the first FCID and the second frame is forwarded to the first endpoint device.

Example Embodiments

Figure 1:
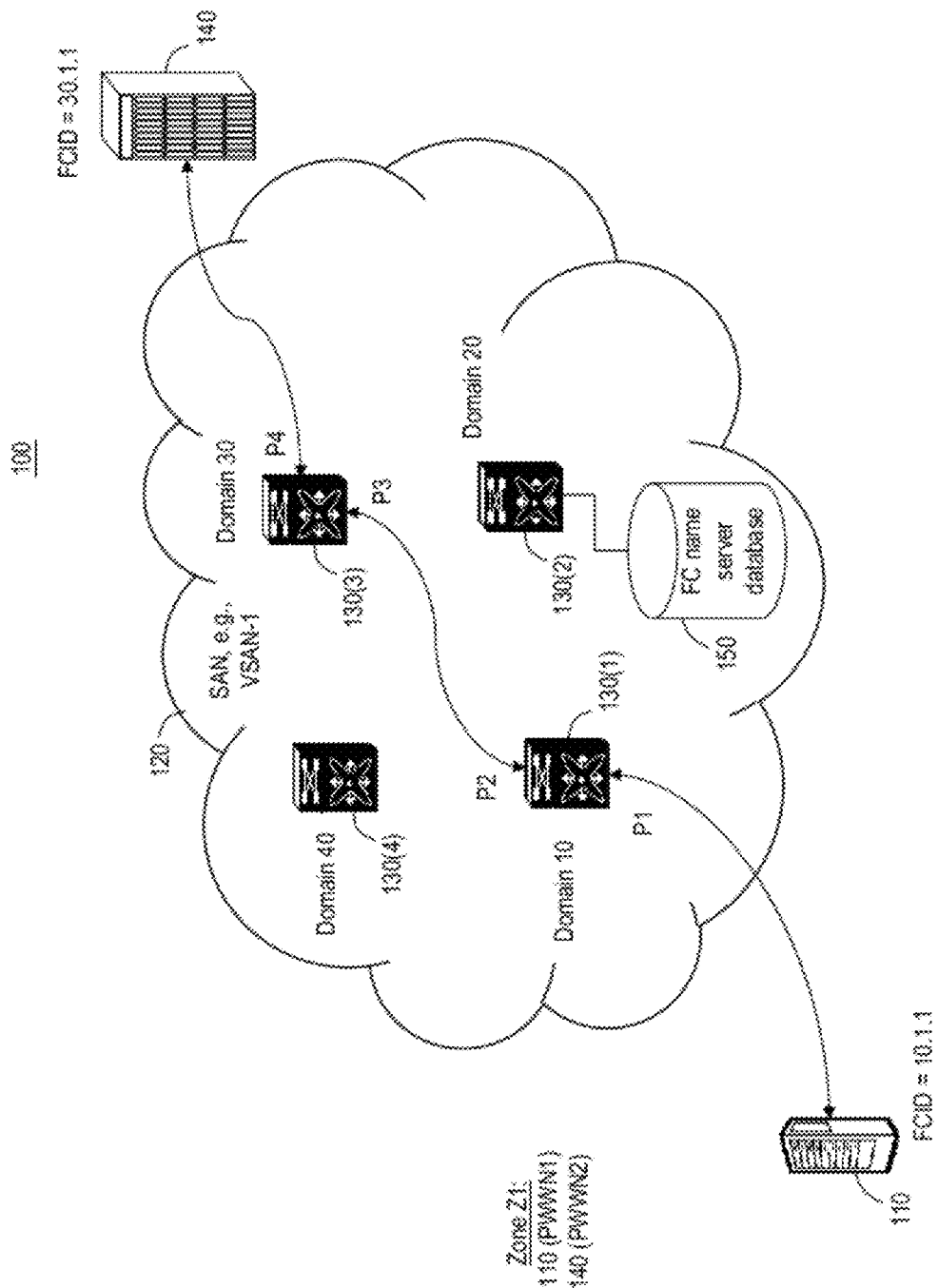
FIG. 1 is an example of a block diagram of a network with switches that are configured to provide FCID mobility for network endpoints that can virtually or physically migrate from one switch to another.

Referring first to FIG. 1, an example system 100 is shown for a virtualized environment. System 100 comprises a first endpoint device 110, an FC network (also referred to herein as a "switched fabric") 120 comprising a plurality of FC and/or Fiber Channel over Ethernet (FCoE) switches 130(1)-130(4), a second endpoint device 140, and an FC name server database 150. The FC network 120 supports SAN traffic for one or more VSANs, e.g., VSAN-1 as shown. Each of the switches 130(1)-130(4) has a corresponding administrator assigned or network assigned domain. In this example, switches 130(1)-130(4) have domains of 10, 20, 30, and 40, respectively. Each of the endpoints 110 and 140 has an address that is assigned by the respective connecting switch that contains the 24-bit FC identifier (FCID). Thus, the VSAN may comprise FC network devices, FCoE network devices or both types of network devices.

The FCID may be separated into three bytes comprising values for a Domain, Area and Port (in a Domain.Area.Port notation) that is included, e.g., in a FC frame header to identify source ports of a source device and destination ports of a destination device. The domain is always associated with the respective switch. In this example, communications between endpoint 110 and switch 130(1) uses FCID 10.1.1 that was assigned by switch 130(1) to endpoint 110 at the time endpoint 110 logged into the network 120. Since "10" is the domain for switch 130(1), all endpoint traffic to switch 130(1) will normally use a 10.x.y FCID, where "x" and "y" are Area and Port values, respectively. Similarly, endpoint 140 is assigned an FCID of 30.1.1 for communication via switch 130(3). The FCIDs used throughout system 100 may be stored and retrieved by any of the FC switches via the FC name server database 150.

Endpoints 110 and 140 may be servers that are part of a server cluster or storage devices that are part of a storage array. Each endpoint has a Port World Wide Name (PWWN) that is used for link layer connectivity, e.g., similar to a Media Access Control (MAC) address used for Ethernet communications. PWWNs may be used to set up zones within the network. Zoning rules define how storage is accessed within the SAN or VSAN. As endpoints 110 and 140 migrate from one switch to another they may remain part of the same zone. In this example, endpoint 110 has a PWWN address of PWWN1, endpoint 140 has a PWWN address of PWWN2, and both are assigned to the same zone, Z1 as shown in FIG. 1.

FIG. 1 shows a bidirectional communications pathway between endpoint 110 and endpoint 140. Switch 130(1) communicates along the pathway using ports P1 and P2, while switch 130(3) communicates along the pathway using ports P3 and P4. The port assignments, zones, domains, and FCIDs are arbitrary and were selected for ease of illustration. In order to illustrate how FCIDs are used according to the techniques described herein, it is useful to set up a communications convention for packets as they traverse the various pathways shown in FIGS. 1-3.

Table 1 below illustrates the source and destination FCIDs for packets going from endpoint 110 to endpoint 140. Each port P1-P4 is bidirectional, so ingress or egress is specified in the second row of Table 1 for each port. In the third row of Table 1, the notation V1: 10.1.1→30.1.1 indicates that the VSAN is VSAN-1 (V1), the packet has a source FCID of 10.1.1 for endpoint 110, and the packet has a destination FCID of 30.1.1 for endpoint 140. Table 1 shows that the source and destination FCIDs remain the same as packets travel from endpoint 110 to endpoint 140.

TABLE 1

FCIDs in the endpoint 110 → endpoint 140 flow direction

| P1 (ingress from 110) | P2 (egress to 130(2)) | P3 (ingress from 130(1)) | P4 (egress to 140) |
|---|---|---|---|
| V1: 10.1.1→30.1.1 | V1: 10.1.1→30.1.1 | V1: 10.1.1→30.1.1 | V1: 10.1.1→30.1.1 |

Table 2 below illustrates the source and destination FCIDs for packets going from endpoint 140 to endpoint 110. Each port P1-P4 is bidirectional, so ingress or egress is specified in the second row of Table 2 for each port. In the third row of Table 2, the notation V1: 30.1.1→10.1.1 indicates that the VSAN is VSAN-1 (V1), the packet has a source FCID of 30.1.1 for endpoint 140, and the packet has a destination FCID of 10.1.1 for endpoint 110. Table 2 shows that the source and destination FCIDs remain the same as packets travel from endpoint 140 to endpoint 110.

TABLE 2

FCIDs in the endpoint 140 → endpoint 110 flow direction

| P4 (ingress from 140) | P3 (egress to 130(1)) | P2 (ingress from 130(2)) | P1 (egress to 110) |
|---|---|---|---|
| V1: 30.1.1→10.1.1 | V1: 30.1.1→10.1.1 | V1: 30.1.1→10.1.1 | V1: 30.1.1→10.1.1 |

Each of the switches 130(1)-130(4) may be configured to execute an FCID mobility process to facilitate the mobility of FCIDs according to the techniques described herein. As endpoints migrate from one switch to another they will usually logout of the network on one switch and log back into another switch, thereby receiving a new FCID associated with the switch domain as described above. In addition, a number of secondary events may occur when device migration takes place, e.g., the storage arrays need to update access information and other data with the new FCID. The FCID mobility process techniques described herein allow endpoint devices or other devices to migrate from one physical switch to another while still retaining their originally assigned FCIDs. The FCID mobility process operations are generally described in connection with FIGS. 2-4, and a specific example is described hereinafter in connection with FIG. 5.

Figure 2:
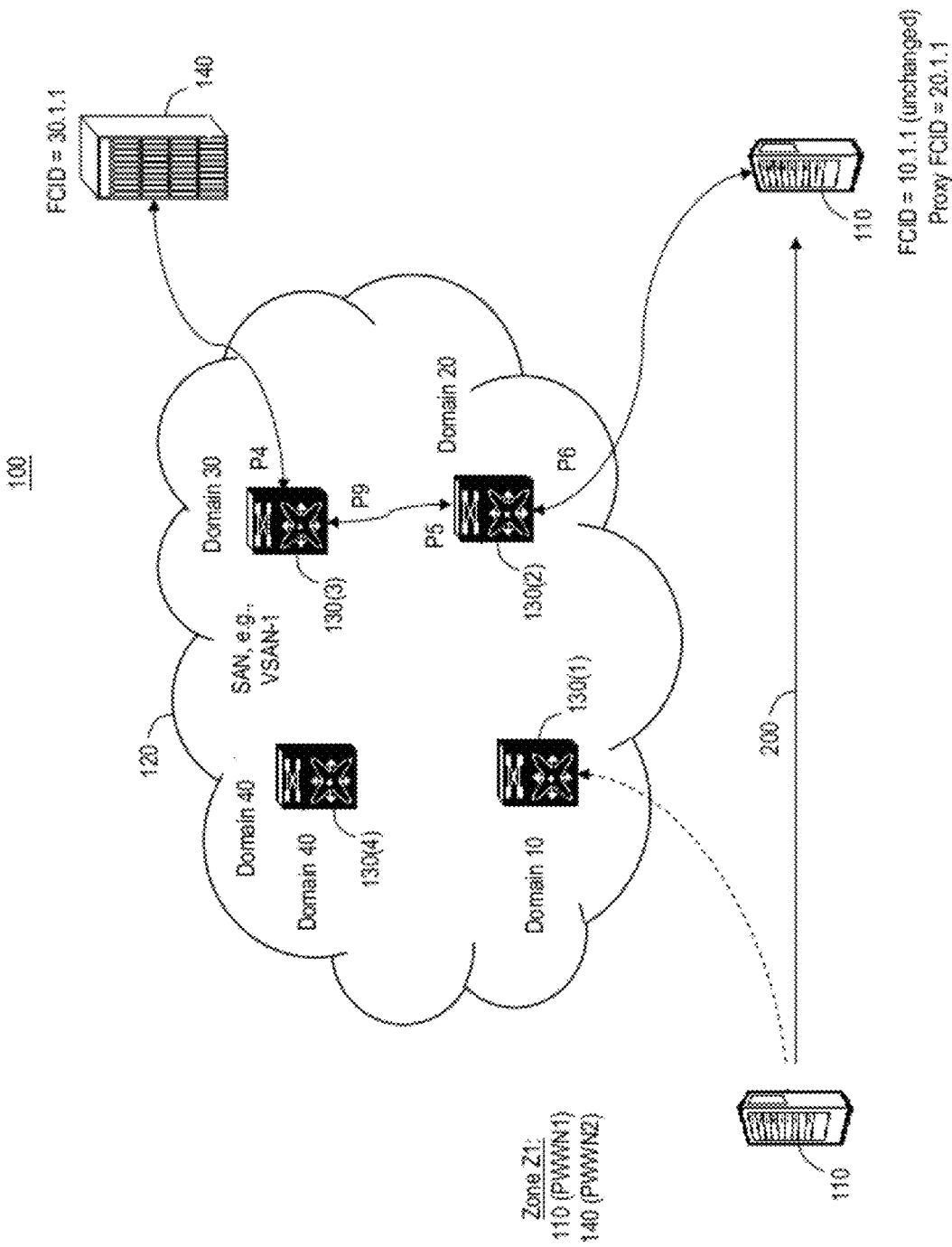
FIG. 2 is an example block diagram similar to FIG. 1 in which a first endpoint has migrated from one switch to another switch.

Turning now to FIG. 2, system 100 is shown in which one endpoint has migrated from one switch to another. In this example, at 200, endpoint 110 is shown migrating from switch 130(1) to switch 130(2). The connection of endpoint 110 to switch 130(1) is taken down as shown by the dashed line between endpoint 110 and its original switch 130(1) as shown in FIG. 1. After the migration, endpoint 110 is now connected to switch 130(2) via port P6 and a connection from switch 130(2) to switch 130(3) is made via port P5 of switch 130(2) and port P9 of switch 130(3). It should be understood that the movement of endpoint 110 from the left side of the figure to the right side of the figure is for illustrative effect and that no physical movement by endpoint 110 may be necessary, for example, endpoint 110 can be a virtual machine running within a physical server. The migration of endpoint 110 from one switch to another may be made for performance optimization, resource optimization, failure handling, or any number of other reasons.

Before endpoint 110 moved to switch 130(2) from switch 130(1), switch 130(2) was aware that endpoint 110 was online and that its current FCID before the move is 10.1.1. Switch 130(2) can obtain this information either from an FC name server database 150 or some move related protocol could have informed switch 130(2) about the move by sending a message that includes the current FCID of 10.1.1 for endpoint 110.

When endpoint 110 connects to switch 130(2) (virtually or physically), switch 130(2) allocates an FCID for endpoint 110 from its own domain, e.g., an FCID of 20.1.1 is assigned to endpoint 110. However, when endpoint 110 logs in at switch 130(2), switch 130(2) responds to the fabric login (FLOGI) request with an FCID of 10.1.1, i.e., the original FCID assigned to endpoint 110 by switch 130(1).

Switch 130(2) also distributes in the SAN information indicating that the allocated FCID for endpoint 110 is 10.1.1 (unchanged) and that its proxy FCID is 20.1.1. This information is sent to all the switches in VSAN 1 including switch 130(3) or specifically to switch 130(3) by a message. The message may be sent using a move related protocol, a proprietary protocol, or using an existing protocol, e.g., the proxy FCID information can be sent in a port login (PLOGI) frame as part of a vendor specific information field. Switches can intercept the PLOGI (at switch 130(2) and switch 130(3) in this example), learn the proxy FCID information, and then remove the vendor specific information from the PLOGI frames before sending the frame to the destination endpoint device. In this way, the proxy information is only learned by the intermediate switches in the communications pathway. Another way to distribute the proxy FCID to original FCID mapping for a device, is to send the mapping via an FC name server or directory server protocol. The switches to which a zoned peer of endpoint 110 are connected to are informed of the proxy to original FCID mapping for endpoint 110. Other switches in the SAN do not need to be aware of the mapping.

The proxy FCID mechanism allows communication between endpoint 110 and endpoint 140 as if endpoint 110 had never moved or migrated. Endpoint 140 sends frames to endpoint 110 as V1: 30.1.1→10.0.0, as endpoint 140 is unaware that endpoint 110 has migrated to a different domain. Endpoint 110 still knows that its FCID is 10.1.1 even though it has migrated to another domain. Switch 130(3) enforces existing zoning rules, e.g., access rules for zone Z1. The frame headers are rewritten to 30.1.1→20.1.1 by switch 130 (3) at the ingress of port P4. Intermediate switches that may be in the path from switch 130(3) to switch 130(2) forward the frames in the usual manner based on the destination address of 20.1.1. The frames eventually reach switch 130(2) along, e.g., the fabric shortest path first (FSPF) from switch 130(3) to switch 130(2). Switch 130(2) rewrites the headers back to 30.1.1→10.1.1 at the egress of the frames at port P6. The rewrite could have occurred at frame ingress at port P5; however, it may be more efficient from hardware resource usage perspective to do the rewrite at port P6 egress. The FCID rewrites at switch 130(2) and switch 130(3) are shown in the Tables 3 and 4 below.

TABLE 3

FCIDs in the endpoint 110 → endpoint 140 flow direction

| P6 (ingress from 110) | P5 (egress to 130(3)) | P9 (ingress from 130(2)) | P4 (egress to 140) |
|---|---|---|---|
| V1: 10.1.1→30.1.1 | V1: 20.1.1→30.1.1 | V1: 20.1.1→30.1.1 | V1: 10.1.1→30.1.1 |

TABLE 4

FCIDs in the endpoint 140 → endpoint 110 flow direction

| P4 (ingress from 140) | P9 (egress to 130(2)) | P5 (ingress from 130(3)) | P6 (egress to 110) |
|---|---|---|---|
| V1: 30.1.1→10.1.1 | V1: 30.1.1→20.1.1 | V1: 30.1.1→20.1.1 | V1: 30.1.1→10.1.1 |

Figure 3:
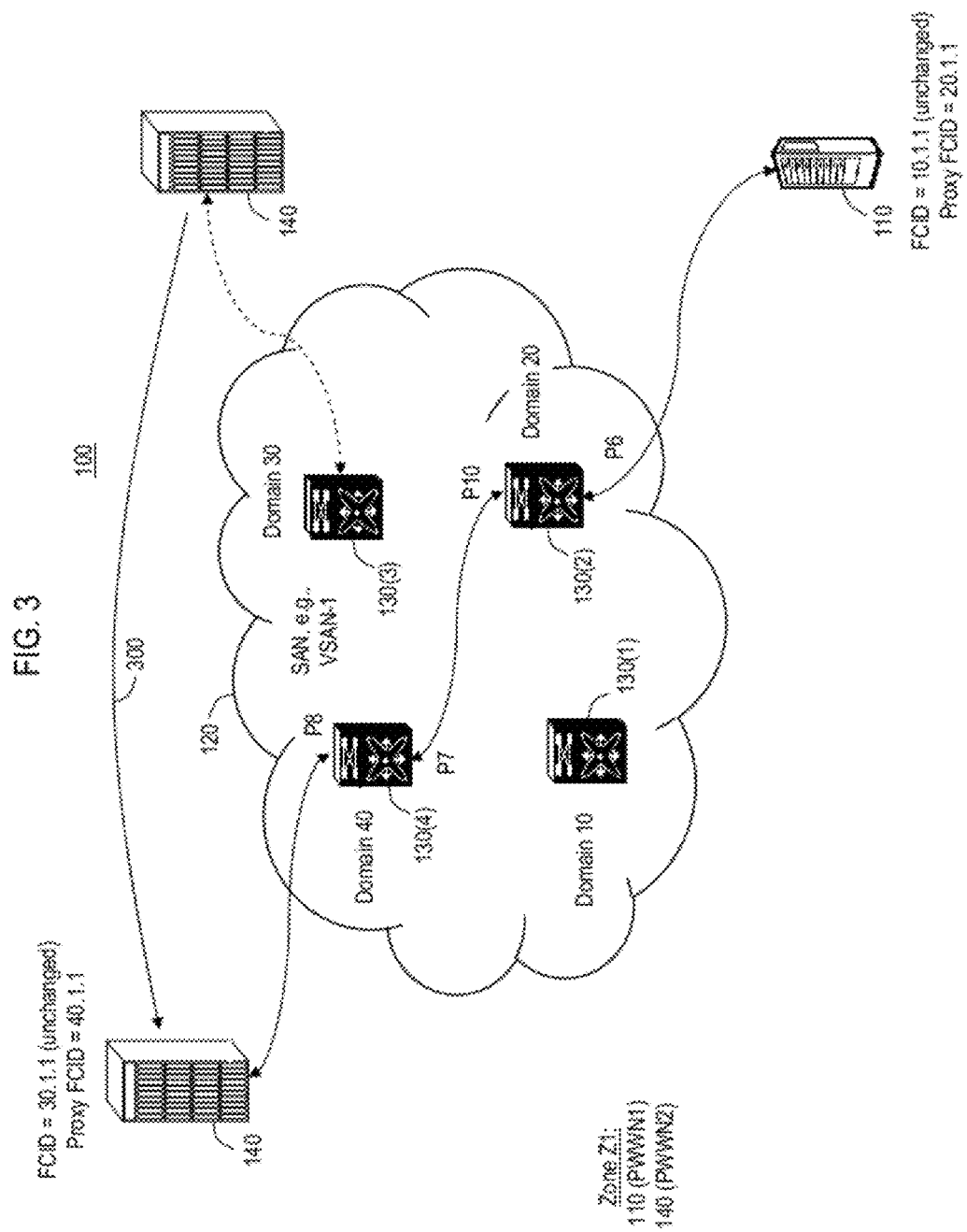
FIG. 3 is an example block diagram similar to FIG. 2 in which a second endpoint has migrated from one switch to another switch.

Referring to FIG. 3, system 100 is shown in which another endpoint has migrated from one switch to another. In this example, at 300, endpoint 140 is shown migrating from switch 130(3) to switch 130(4). The connection of endpoint 140 to switch 130(3) is taken down as shown by the dashed line shown in FIG. 3. Endpoint 140 is now connected to switch 130(4) via port P8. A connection is made from port P7 of switch 130(4) to port P10 of switch 130(2). It should be understood that the movement of endpoint 140 from the right side of the figure to the left side of the figure is for illustrative effect and that no physical movement by endpoint 140 is necessary.

Before endpoint 140 moved to switch 130(4) from switch 130(3), switch 130(4) was aware that endpoint 140 was online and that its current FCID before the move is 30.1.1. When endpoint 140 connects to switch 130(4), either virtually or physically, switch 130(4) allocates an FCID for endpoint 140 from its own domain 40, e.g., an FCID of 40.1.1 is assigned to endpoint 140. However, when endpoint 140 logs in at switch 130(4), switch 130(4) responds to FLOGI request with an FCID of 30.1.1, i.e., the original FCID assigned by switch 130(3).

Switch 130(4) also distributes in the SAN information indicating that the allocated FCID for endpoint 140 is 30.1.1 (unchanged) and that it has been assigned a proxy FCID is 40.1.1. This information may be sent to all the switches in VSAN 1 including switch 130(2) or specifically to switch 130(2) by a message. The proxy FCID mechanism allows communication between endpoint 110 and endpoint 140 as if endpoint 140 had never moved. Endpoint 110 sends frames to endpoint 140 as V1: 10.1.1→30.0.0 as endpoint 110 is unaware that endpoint 140 has moved to a different domain. Endpoint 140 still knows that its assigned FCID is 30.1.1 even though it has moved to another domain. Switch 130(2) enforces the existing zoning rules, e.g., access rules for zone Z1. The frame headers are rewritten to 20.1.1→40.1.1 by switch 130(2) at the ingress of port P6. Intermediate switches that may be in the path from switch 130(2) to switch 130(4) forward the frames in the usual manner based on the destination address of 40.1.1. The frames eventually reach switch 130(4) along the FSPF from switch 130(2) to switch 130(4). Switch 130(4) rewrites the headers back to 10.1.1→30.1.1 at the egress of the frames at port P8. FCID rewrites at switch 130(2) and switch 130(3), respectively, are shown in the Tables 5and 6 below.

TABLE 5

FCIDs in the endpoint 110 → endpoint 140 flow direction

| P6 (ingress from 110) | P10 (egress to 130(3)) | P7 (ingress from 130(2)) | P8 (egress to 140) |
|---|---|---|---|
| V1: 10.1.1→30.1.1 | V1: 20.1.1→40.1.1 | V1: 20.1.1→40.1.1 | V1: 10.1.1→30.1.1 |

TABLE 6

FCIDs in the endpoint 140 → endpoint 110 flow direction

| P8 (ingress from 140) | P7 (egress to 130(2)) | P10 (ingress from 130(3)) | P6 (egress to 110) |
|---|---|---|---|
| V1: 30.1.1→10.1.1 | V1: 40.1.1→20.1.1 | V1: 40.1.1→20.1.1 | V1: 30.1.1→10.1.1 |

Figure 4:
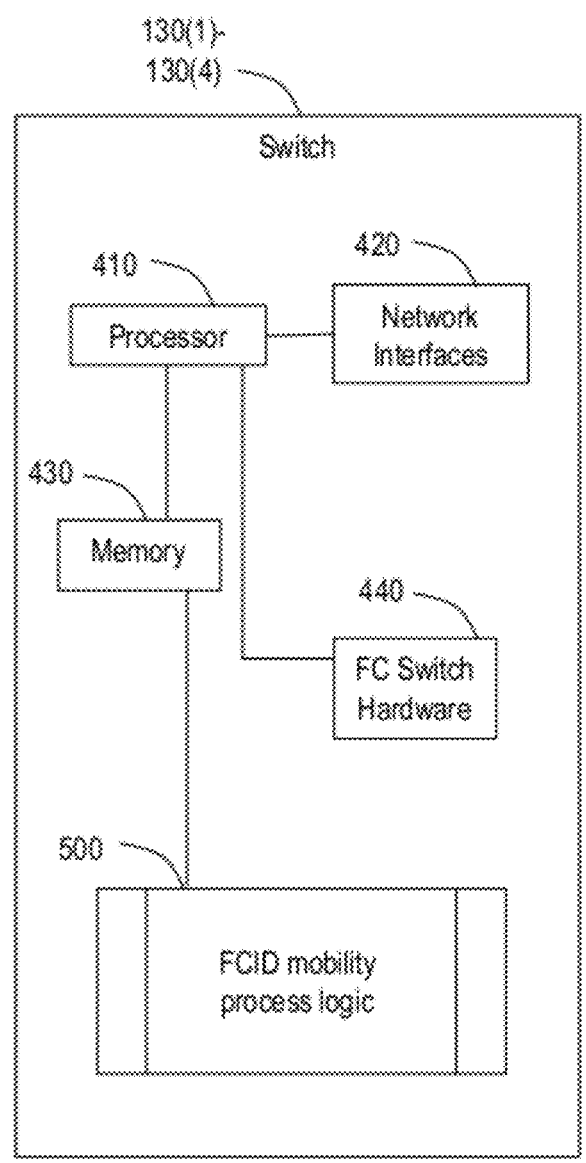
FIG. 4 is an example block diagram of a switch configured to provide FCID mobility for endpoint devices.

Referring to FIG. 4, an example block diagram of a switch device, e.g., one of switches 130(1)-130(4), is shown. The switch comprises a data processing device 410, one or more network interfaces 420, a memory 430, and FC switch hardware 440. Resident in the memory 430 is software for FCID mobility process logic 500. Process logic 500 may also be implemented in hardware using hardware that is part of the FC switch hardware 440, or be implemented in a combination of both hardware and software.

The data processing device 410 is, for example, a microprocessor, a microcontroller, systems on a chip (SOCs), or other fixed or programmable logic. The data processing device 410 is also referred to herein simply as a processor. The memory 430 may be any form of random access memory (RAM), FLASH memory, disk storage, or other tangible (non-transitory) memory media device that stores data used for the techniques described herein. The memory 430 may be separate or part of the processor 410. Instructions for performing the process logic 500 may be stored in the memory 430 for execution by the processor 410 such that when executed by the processor, causes the processor to perform the operations describe herein in connection with FIGS. 1-3 and 5. The network interfaces 420 enable communication over network 120 shown in FIG. 1 and to endpoint devices, and thus include a FC, FCoE, or Host Bus Adapter (HBA) interfaces. The network interfaces 420 may be configured to be coupled to the processor 410. It should be understood that any of the devices in system 100 may be configured with a similar hardware or software configuration as switches 130(1)-130(4).

The functions of the processor 410 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 430 stores data used for the computations or functions described herein (and/or to store software or processor instructions that are executed to carry out the computations or functions described herein). Thus, functions of the FCID mobility process logic 500 may be implemented with fixed logic or programmable logic (e.g., software or computer instructions executed by a processor or field programmable gate array (FPGA)).

The FC switch hardware 440 performs the basic FC switching operations according to the FC standard, and may be implemented by one or more ASICs. In addition, the FC switch hardware 440 may be used to implement fast FCID address rewrites or overwrites in the FC frames without involving the switch Central Processing Unit (CPU), e.g., processor 410, or a separate processor associated with one of the network interfaces 420. The FC switch hardware 440 may be coupled to processor 410 or be implemented as part of processor 410. Thus, the switch hardware 440 facilitates network communications, e.g., over the network including endpoint devices.

Figure 5:
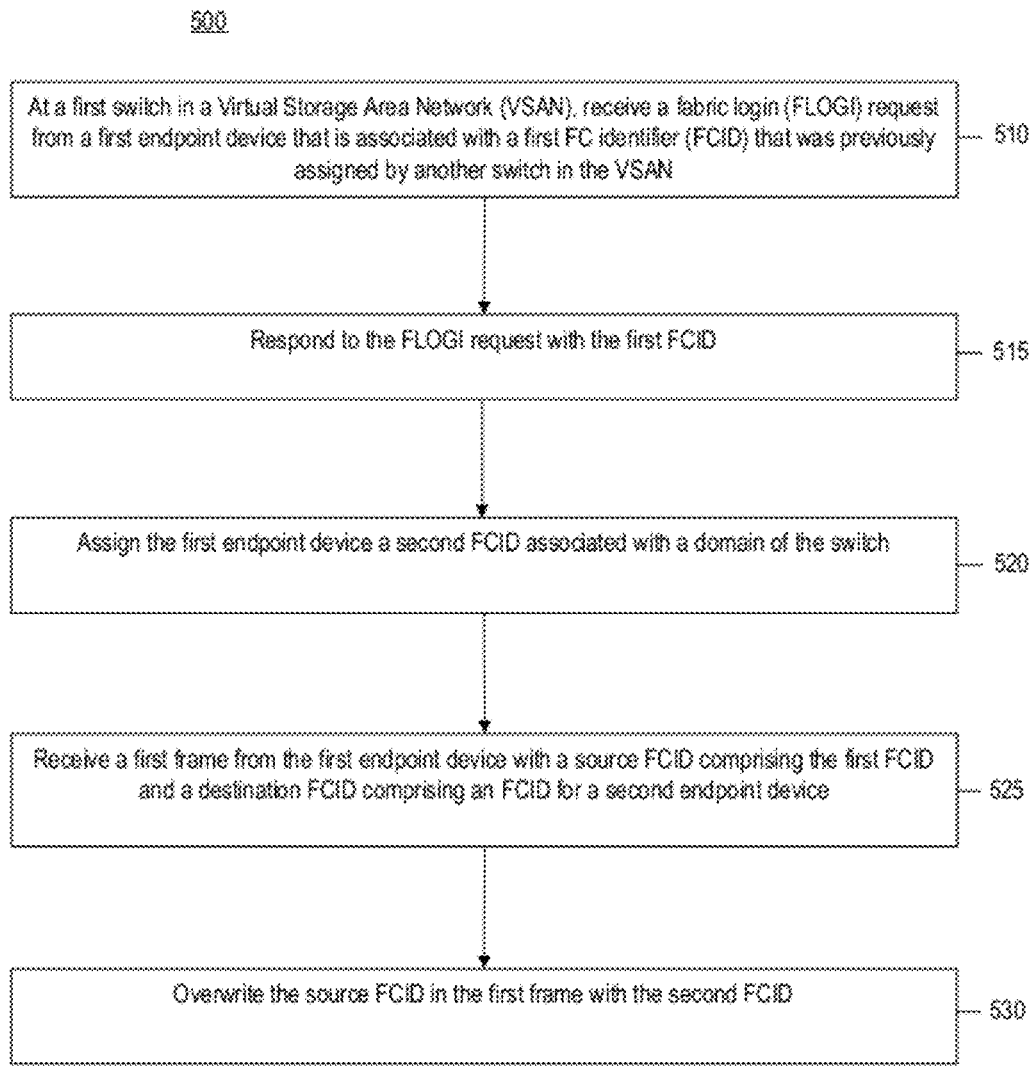
FIG. 5 is an example flowchart depicting a process for providing FCID mobility for network endpoints according to a first embodiment.

Referring to FIG. 5, an example of a flowchart is shown that generally depicts the operations of the FCID mobility process logic 500 that allows endpoint devices to migrate from one physical switch to another while still retaining their originally assigned FCIDs. At 510, at a first switch, e.g., one of switches 130(1)-130(4), in a network (e.g., a VSAN), a FLOGI request is received from a first endpoint device, e.g., endpoint 110 in FIG. 1. The first endpoint device is associated with a first FCID that was previously assigned by another switch in the VSAN. In this example, the first endpoint is migrating from another switch to the first switch.

At 515, a response to the FLOGI request is sent to the first endpoint device with the first FCID, i.e., the first endpoint device's original FCID. Since the first endpoint device is assigned its original FCID by the first switch, the endpoint device does not have to make any internal changes or adjustments, and continues to communicate with other devices as if it had not migrated to the first switch. At 520, the first endpoint device is assigned a second FCID associated with a domain of the switch. The second FCID acts as proxy FCID for the first endpoint device during communication within the VSAN, i.e., communication across the switched fabric. At this point, the first endpoint device is unaware of the proxy FCID and operates as if it had never migrated to another switch.

At 525, a first frame is received from the first endpoint device with a source FCID comprising the first FCID and a destination FCID comprising an FCID for a second endpoint device. At 530, the source FCID in the first frame is overwritten with the second FCID. Thus, when transmitted or forwarded from the switch into the VSAN the frame is now associated with the switch's domain. The flow chart for the FCID mobility process logic 500 continues in FIG. 6 when frames are received from the VSAN that are addressed to the first endpoint device.

Figure 6:
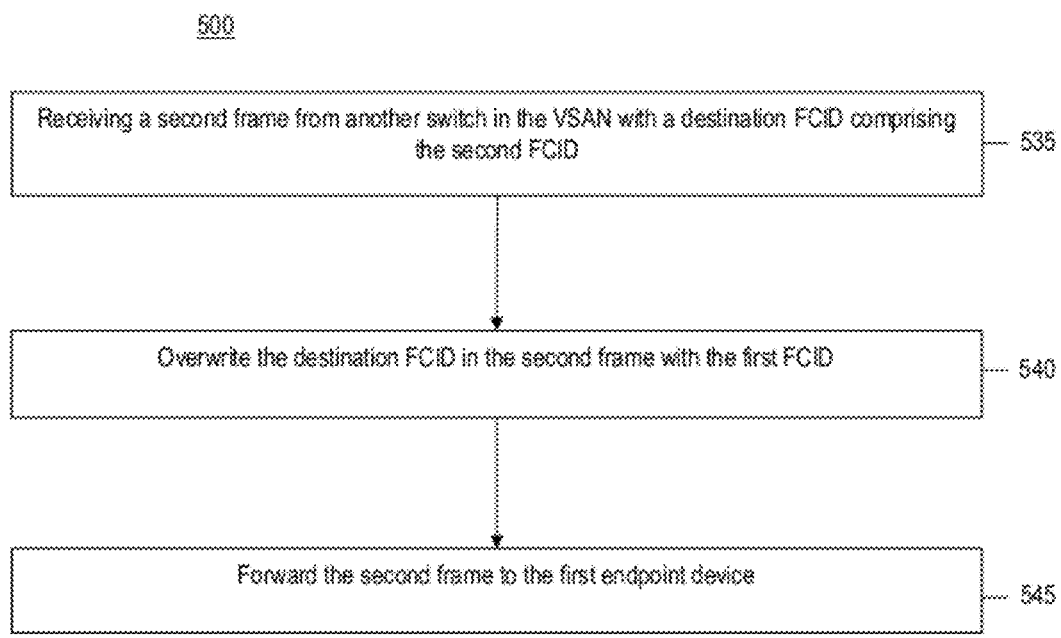
FIG. 6 is an example of a flowchart depicting a continuation of the process from FIG. 5 for a switch to provide FCID mobility in the reverse direction from the second endpoint to the first endpoint.

Turning to FIG. 6, FCID mobility process logic 500 performs similar operations on frames received from another switch in the VSAN. At 535, a second frame is received from another switch in the VSAN with a destination FCID comprising the second FCID. The second FCID acts as a proxy for the first FCID of the first endpoint. At 540, the destination FCID in the second frame is overwritten with the first FCID. At 545, the second frame is forwarded to the first endpoint device. At this point, the first endpoint device remains unaware of the FCID proxy process occurring between switches in the fabric.

In another example, the second endpoint device has migrated to another switch and sends a frame to the first endpoint device. A message is received at the first switch from a second switch comprising information that indicates that the second endpoint device has been assigned a fourth FCID associated with a domain of the second switch that proxies for a third FCID that was previously assigned to the second endpoint by another switch in the VSAN. A second frame is received from the second switch with a source FCID comprising the fourth FCID and a destination FCID comprising the second FCID. The source FCID in the second frame is overwritten with the third FCID and the destination FCID in the second frame is overwritten with the first FCID. The second frame is forwarded to the first endpoint device.

In still a further example, the second endpoint device has migrated to another switch and the first endpoint device sends a frame to the second endpoint device. A message is received from a second switch comprising information that indicates that the second endpoint device has been assigned a fourth FCID that proxies for a third FCID that was previously assigned to the second endpoint by another switch in the VSAN. A second frame is received from the first endpoint device with a source FCID comprising the first FCID and a destination FCID comprising the third FCID. The source FCID in the second frame is overwritten with the second FCID and the destination FCID in the second frame is overwritten with the fourth FCID. The second frame is forwarded to the second endpoint device.

The first switch can determine the first FCID before responding the FLOGI request in a number of ways. By way of example, a message is received by the first switch that comprises information that indicates the first endpoint device has a pending migration to the first switch and the message contains the first FCID or the first switch can look up the first FCID in an FC name server database prior to responding to the FLOGI request with the first FCID. Proxy FCIDs may also be stored and retrieved via the name server database. As described above, proxy FCIDs may be exchanged using messages that consist of PLOGI request frames or by way of messages using other protocols. In one example, a PLOGI request frame is received from the first endpoint device. The second FCID (proxy FCID) is added by the first switch to a vendor specific information field in the PLOGI frame. The PLOGI request frame is forwarded by the first switch.

The proxy FCIDs may also be acquired by switches via PLOGI request frames. In one example, a PLOGI request frame is received from another endpoint device in the VSAN. A proxy FCID is extracted from a vendor specific information field in the PLOGI frame and the proxy FCID is used to overwrite source FCIDs for frames addressed to the first endpoint device. The PLOGI request frame is forwarded to the first endpoint device. The proxy information may be erased from the vendor specific information field prior to forwarding.

Figure 8:
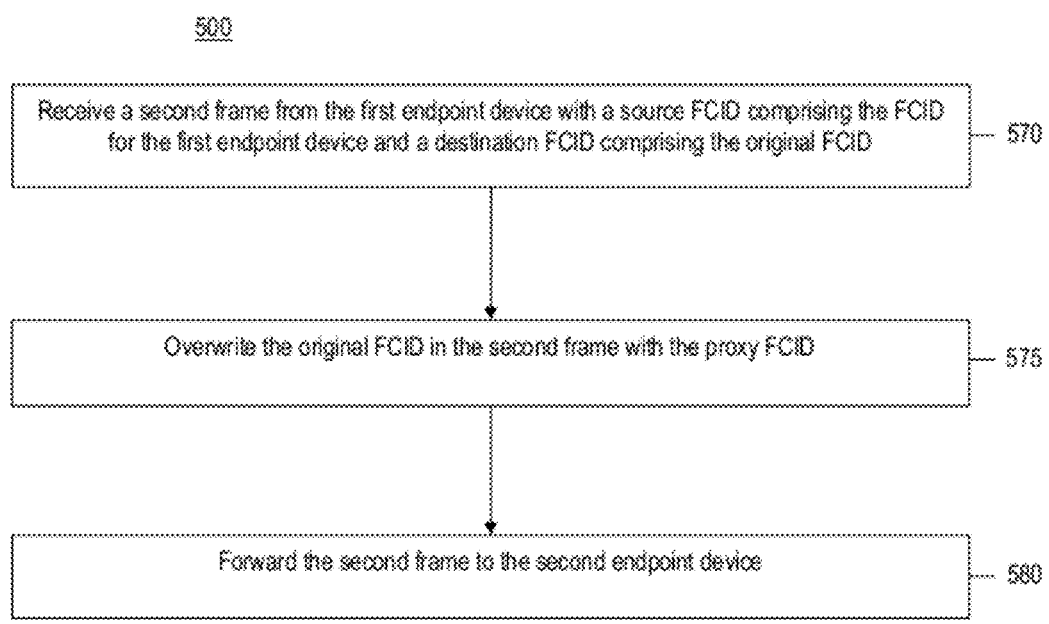
FIG. 8 is an example of a flowchart depicting a continuation of the process from FIG. 7 for a switch to provide FCID mobility in the reverse direction from the second endpoint to the first endpoint.

Referring to FIG. 7, further techniques are provided by FCID mobility process logic 500 according to a second embodiment in which the first endpoint device has not migrated and the second endpoint device has migrated. At 550, a first switch is coupled to the first endpoint device and a second switch. The second switch is coupled to the second endpoint device and has assigned the second endpoint device an original FCID. A message is received at the first switch from a third switch comprising information that indicates that the second endpoint device has been assigned a proxy FCID that proxies for the original FCID. At 555, a first frame is received from the third switch with a source FCID comprising the proxy FCID and a destination FCID comprising an FCID for the first endpoint device. At 560, the proxy FCID in the first frame is overwritten with the original FCID. And at 565, the frame is forwarded to the first endpoint device. The flow chart for the FCID mobility process logic 500 continues in FIG. 8 when frames are received from the first endpoint device that are addressed to the second endpoint device Turning to FIG. 8, FCID mobility process logic 500 performs similar operations on frames received from the first endpoint device. At 570, a second frame is received from the first endpoint device with a source FCID comprising the FCID for the first endpoint device and a destination FCID comprising the original FCID. AT 575, the original FCID in the second frame is overwritten with the proxy FCID. The second frame is forwarded to the second endpoint device.

For simplicity of description, the above description has been provided in which all the devices are in the same VSAN.

The techniques described herein are equally applicable if the devices in system 100 are in different VSANs and are communicating by way of Inter-VSAN Routing (IVR). Furthermore, the techniques described herein are applicable to Fiber Channel over Ethernet (FCoE) networks and devices. The actual rewriting of the FCIDs and FCID management may be implemented in an intelligent line card device with a programmable processor or an ASIC.

As described above, only the originally assigned FCIDs of the endpoint devices are returned to endpoints during fabric login. In one example, if an endpoint requests the FCIDs of the peers that are in the same zone, only the originally assigned FCIDs are returned to the endpoint. Proxy FCIDs are only known to the switches. For any given endpoint, at most two FCIDs are maintained for an endpoint device, i.e., the original FCID and a proxy FCID. Original source FCIDs (source end-device to switch) and destination FCIDs (switch to destination end-device) remain unchanged, and hence, no FCID rewrites are needed at endpoints for the frames exchanged between the endpoints, e.g., at ports P6 and P4 shown in FIG. 2.

In addition, the switches may be capable of FCID rewrites in the hardware, e.g., on frame ingress or egress from the switch ports, which make the techniques described herein available on some platforms using existing hardware. When an endpoint device moves or migrates, the name server database may be updated with the current location, e.g., current switch and port, of the endpoint device and its current proxy FCID. The remaining elements of the name server database entry for the endpoint device may remain unchanged. The FCID mobility feature can be selectively enabled on a per end-device basis, per VSAN basis, or for all the VSANs in the network.

In sum, techniques are provided herein to assign proxy FCIDs to endpoint devices so that the endpoint devices may achieve FCID mobility by retaining their originally assigned FCIDs. At a switch in a network, e.g., a VSAN, a fabric login (FLOGI) request is received from a first endpoint device that is associated with a first FCID that was previously assigned to the first endpoint device by another switch in the VSAN. The response to the FLOGI request contains the first FCID. The first endpoint device is assigned a second FCID associated with a domain of the switch and the second FCID is used as a proxy FCID within the VSAN for the first endpoint device. A first frame is received from the first endpoint device with a source FCID comprising the first FCID and a destination FCID comprising an FCID for a second endpoint device. The source FCID in the first frame is overwritten (i.e., replaced) with the second FCID. The first frame is forwarded to the second endpoint device.

Techniques are also provided herein for receiving a second frame from another switch in the VSAN with a destination FCID comprising the second FCID. The destination FCID in the second frame is overwritten (i.e., replaced) with the first FCID and the second frame is forwarded to the first endpoint device.

The techniques described herein vastly reduce the operational steps for endpoint devices when the endpoint devices are migrated to different devices in the VSAN. SAN devices can retain their FCIDs as they move dynamically within a SAN among multiple SAN switches. This in turn eliminates the need for propagating device offline and device online events throughout the SAN as is typically performed when a SAN device moves to another switch or domain. Configuration changes are reduced for end devices that have peer device FCID based configurations. The edge switches where the SAN devices are attached are aware of the proxy FCIDs, and core SAN switches simply forward the traffic as they normally do and are unaware of the FCID rewrites used for device mobility.

The above description is intended by way of example only.

What is claimed is:

1. A method comprising:
   at a first switch in a network, receiving a login request from a first endpoint device that is associated with a first FC identifier (FCID) that was previously assigned to the first endpoint device by a second switch in the network, wherein the second switch is associated with a different domain than the first switch;
   determining that the first endpoint device has been migrated to the first switch;
   responding to the login request with the first FCID;
   assigning the first endpoint device a second FCID associated with a domain of the first switch, wherein the second FCID is used as a proxy FCID between switches in the network for the first endpoint device;
   receiving a first frame from the first endpoint device with a source FCID comprising the first FCID and a destination FCID comprising an FCID for a second endpoint device;
   overwriting the source FCID in the first frame with the second FCID such that the first frame is associated with the domain of the first switch domain after transmission from the first switch; and
   forwarding the first frame to the second endpoint device associated with a third switch.

2. The method of claim 1, further comprising:
   receiving a second frame from the third switch in the network with a destination FCID comprising the second FCID;
   overwriting the destination FCID in the second frame with the first FCID; and
   forwarding the second frame to the first endpoint device.

3. The method of claim 1, further comprising:
   receiving a message from the third switch comprising information that indicates that the second endpoint device has been assigned a fourth FCID associated with a domain of the third switch that proxies for a third FCID that was previously assigned to the second endpoint device by a fourth switch in the network;
   receiving a second frame from the third switch with a source FCID comprising the fourth FCID and a destination FCID comprising the second FCID;
   overwriting the source FCID in the second frame with the third FCID and the destination FCID in the second frame with the first FCID; and
   forwarding the second frame to the first endpoint device.

4. The method of claim 1, further comprising:
   receiving a message from the third switch comprising information that indicates that the second endpoint device has been assigned a fourth FCID that proxies for a third FCID that was previously assigned to the second endpoint by a fourth switch in the network;
   receiving a second frame from the first endpoint device with a source FCID comprising the first FCID and a destination FCID comprising the third FCID;
   overwriting the source FCID in the second frame with the second FCID and the destination FCID in the second frame with the fourth FCID; and
   forwarding the second frame to the second endpoint device.

5. The method of claim 1, further comprising receiving a message that the first endpoint device has a pending migration to the first switch, wherein the message contains the first FCID.

6. The method of claim 1, further comprising looking up the first FCID in an FC name server database prior to responding to the login request with the first FCID.

7. The method of claim 1, further comprising:
   receiving a port login request frame from the first endpoint device;
   adding the second FCID to a vendor specific information field in the port login request frame; and
   forwarding the port login request frame.

8. The method of claim 1, further comprising:
   receiving a port login request frame from another endpoint device in the network;
   extracting a proxy FCID from a vendor specific information field in the port login request frame, wherein the proxy FCID is used to overwrite source FCIDs for frames addressed to the first endpoint device; and
   forwarding the port login request frame to the first endpoint device.

9. A method comprising:
   at a first switch coupled to a first endpoint device and a second switch in a network, wherein the second switch is associated with a first domain, and is coupled to a second endpoint device and has assigned the second endpoint device an original FCID associated with the first domain, receiving a message from a third switch associated with a second domain, the message comprising information that indicates that the second endpoint device has been assigned a proxy FCID associated with the second domain that is configured to proxy for the original FCID between switches in the network;
   receiving a first frame from the third switch with a source FCID comprising the proxy FCID and a destination FCID comprising an FCID for the first endpoint device;
   overwriting the proxy FCID in the first frame with the original FCID; and
   forwarding the first frame to the first endpoint device.

10. The method of claim 9, further comprising:
    receiving a second frame from the first endpoint device with a source FCID comprising the FCID for the first endpoint device and a destination FCID comprising the original FCID;
    overwriting the original FCID in the second frame with the proxy FCID; and
    forwarding the second frame to the second endpoint device.

11. An apparatus comprising:
    one or more network interfaces configured to enable communication between devices in a network;
    switch hardware of a first switch configured to facilitate the communication between devices; and
    a processor configured to be coupled to the one or more network interfaces and the switch hardware, and configured to:
    receive a login request via the one or more network interfaces from a first endpoint device that is associated with a first FC identifier (FCID) that was previously assigned to the first endpoint device by a second switch in the network, wherein the second switch is associated with a different domain than the first switch;
    determine that the first endpoint device has been migrated to the first switch;
    respond to the login request with the first FCID;
    assign the first endpoint device a second FCID associated with a domain of the first switch, wherein the second FCID is used as a proxy FCID between switches in the network for the first endpoint device;

receive a first frame from the first endpoint device with a source FCID comprising the first FCID and a destination FCID comprising an FCID for a second endpoint device associated with a third switch;

overwrite the source FCID in the first frame with the second FCID using the switch hardware such that the first frame is associated with the domain of the first switch domain after transmission from the first switch; and forward the first frame to the second endpoint device associated with a third switch via the one or more network interfaces.

12. The apparatus of claim 11, wherein the processor is further configured to:

receive a second frame from the third switch in the network with a destination FCID comprising the second FCID;

overwrite the destination FCID in the second frame with the first FCID; and forward the second frame to the first endpoint device.

13. The apparatus of claim 11, wherein the processor is further configured to:

receive a message from the third switch comprising information that indicates that the second endpoint device has been assigned a fourth FCID associated with a domain of the third switch that proxies for a third FCID that was previously assigned to the second endpoint by a fourth switch in the network;

receive a second frame from the third switch with a source FCID comprising the fourth FCID and a destination FCID comprising the second FCID;

overwrite the source FCID in the second frame with the third FCID and the destination FCID in the second frame with the first FCID; and forward the second frame to the first endpoint device.

14. The apparatus of claim 11, wherein the processor is further configured to:

receive a message from the third switch comprising information that indicates that the second endpoint device has been assigned a fourth FCID that proxies for a third FCID that was previously assigned to the second endpoint by a fourth switch in the network;

receive a second frame from the first endpoint device with a source FCID comprising the first FCID and a destination FCID comprising the third FCID;

overwrite the source FCID in the second frame with the second FCID and the destination FCID in the second frame with the fourth FCID; and forward the second frame to the second endpoint device.

15. The apparatus of claim 11, wherein the processor is further configured to receive a message that the first endpoint device has a pending migration to the first switch, wherein the message contains the first FCID.

16. The apparatus of claim 11, wherein the processor is further configured to look up the first FCID in an FC name server database prior to responding to the login request with the first FCID.

17. The apparatus of claim 11, wherein the processor is further configured to:

receive a port login request frame from the first endpoint device;

add the second FCID to a vendor specific information field in the port login request frame; and forward the port login request frame.

18. One or more non-transitory computer readable media storing instructions that, when executed by a processor, cause the processor to:

receive a login request from a first endpoint device that is associated with a first FC identifier (FCID) that was previously assigned to the first endpoint device by a second switch in a network, wherein the second switch is associated with a different domain than the first switch;

determine that the first endpoint device has been migrated to the first switch;

respond to the login request with the first FCID;

assign the first endpoint device a second FCID associated with a domain of a first switch, wherein the second FCID is used as a proxy FCID between switches in the network for the first endpoint device;

receive a first frame from the first endpoint device with a source FCID comprising the first FCID and a destination FCID comprising an FCID for a second endpoint device associated with a third switch;

overwrite the source FCID in the first frame with the second FCID such that the first frame is associated with the domain of the first switch domain after transmission from the first switch; and forward the first frame to the second endpoint device associated with a third switch.

19. The non-transitory computer readable media of claim 18, further comprising instructions that, when executed by the processor, cause the processor to:

receive a second frame from the third switch in the network with a destination FCID comprising the second FCID;

overwrite the destination FCID in the second frame with the first FCID; and forward the second frame to the first endpoint device.

20. The non-transitory computer readable media of claim 18, further comprising instructions that, when executed by the processor, cause the processor to:

receive a message from the third switch comprising information that indicates that the second endpoint device has been assigned a fourth FCID associated with a domain of the third switch that proxies for a third FCID that was previously assigned to the second endpoint device by a fourth switch in the network;

receive a second frame from the third switch with a source FCID comprising the fourth FCID and a destination FCID comprising the second FCID;

overwrite the source FCID in the second frame with the third FCID and the destination FCID in the second frame with the first FCID; and forward the second frame to the first endpoint device.

21. The non-transitory computer readable media of claim 18, further comprising instructions that, when executed by the processor, cause the processor to:

receive a message from the third switch comprising information that indicates that the second endpoint device has been assigned a fourth FCID that proxies for a third FCID that was previously assigned to the second endpoint by a fourth switch in the network;

receive a second frame from the first endpoint device with a source FCID comprising the first FCID and a destination FCID comprising the third FCID;

overwrite the source FCID in the second frame with the second FCID and the destination FCID in the second frame with the fourth FCID; and forward the second frame to the second endpoint device.

22. The non-transitory computer readable media of claim 18, further comprising instructions that, when executed by the processor, cause the processor to receive a message that the first endpoint device has a pending migration to the first switch, wherein the message contains the first FCID.

23. The non-transitory computer readable media of claim 18, further comprising instructions that, when executed by the processor, cause the processor to look up the first FCID in an FC name server database prior to responding to the login request with the first FCID.

24. The non-transitory computer readable media of claim 18, further comprising instructions that, when executed by the processor, cause the processor to:
- receive a port login request frame from the first endpoint device;
- add the second FCID to a vendor specific information field in the port login request frame; and
- forward the port login request frame.

* * * * *